G. E. COOPER.
Grain-Drill.

No. 55,243.  Patented June 5, 1866.

Witnesses:
Chas D Smith
James L Ewin

Inventor:
Geo. E. Cooper
By Munn & Co
Attorneys

UNITED STATES PATENT OFFICE.

GEORGE E. COOPER, OF BALTIMORE, MARYLAND.

IMPROVEMENT IN COMBINED DRILL AND FERTILIZER.

Specification forming part of Letters Patent No. 55,243, dated June 5, 1866.

*To all whom it may concern:*

Be it known that GEORGE E. COOPER, of the city and county of Baltimore, and State of Maryland, have invented a new and useful Grain-Drill and Fertilizer Combined; and I do hereby declare the following to be a full, clear, and exact description of the nature, construction, and operation of the same, reference being had to the accompanying drawings, which are made a part of this specification, and in which—

Figure 1:
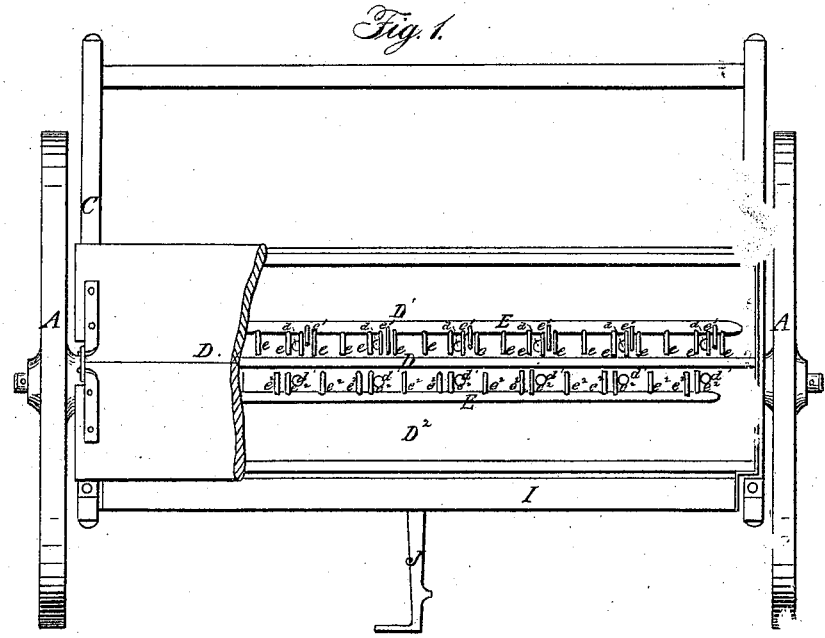
Figure 2:
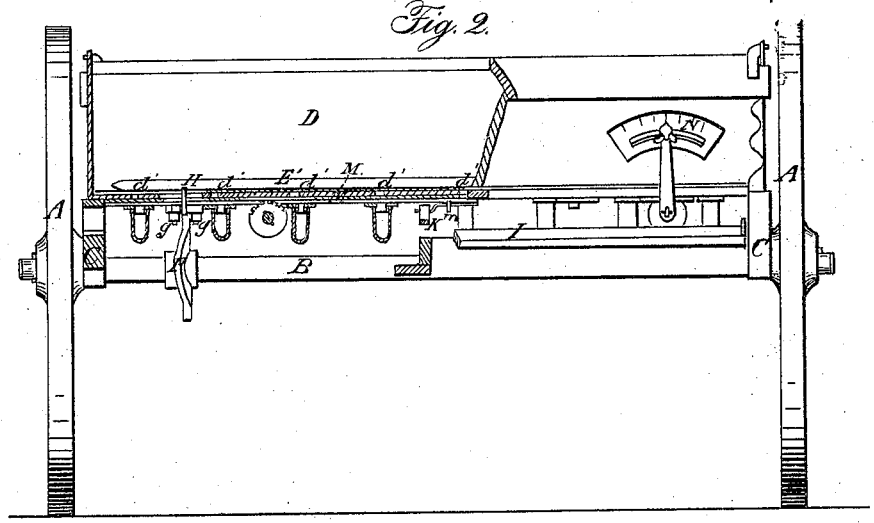
Figure 3:
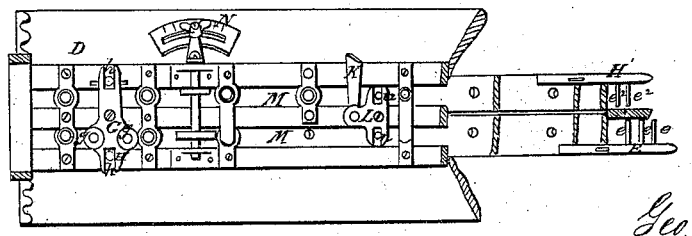

Figure 1 is a plan, partly in section. Fig. 2 is a transverse vertical section. Fig. 3 is a detached sectional inverted view of the hopper and its appurtenances.

Similar letters of reference indicate corresponding parts in the different figures.

My invention consists, principally, in the dropping mechanism, the hopper of which is divided into two compartments, one for seed and the other for a fertilizing phosphate, each of said compartments having a reciprocating rod carrying pins which project over the discharge-apertures of the hopper, and by moving to and fro over the same force the seed and the fertilizing substance through them, so as to cause a regular and unretarded discharge.

The invention also consists in an arrangement whereby the discharge-orifices of the hopper are closed and opened simultaneously with the raising and lowering of the drill-tubes. Also, in a peculiar cam arrangement for operating and reciprocating rods in the hopper.

The following description, in connection with the accompanying drawings, will enable others skilled in the art to which my invention appertains to fully understand and use the same.

A A are the wheels, and B the axle. C is the frame on which is mounted the hopper D, which is divided into two compartments, D' D², by a longitudinal partition, D³.

E E' represent rods, which are placed within and lengthwise of the respective compartments D' D², each of said rods being placed at one side of the discharge-apertures, so as to prevent obstruction to the passage of the seed. The rod E in the compartment D' has inserted in it a series of pins, $e$, one, two, or more of which project horizontally over each of the seed-apertures $d$ in the bottom of the hopper. On the same rod E are upwardly-projecting pins $e'$, which serve to agitate the seed and prevent clogging. The pins $e$, as they are moved to and fro with the rod E, alternately open and close the seed-apertures $d$, and thus insure the intermittent dropping of the seed. The rod E' in the compartment D² also has a series of pins, $e^2$, projecting over the apertures $d'$, through which the fertilizing substance is discharged from the hopper. The pins $e^2$ regulate the flow of the phosphate as the pins $e$ regulate the flow of the seed.

The rods E E' are reciprocated by a cam, F, which is keyed to the axle B and plays between two friction-rollers, $g\ g$, on the vibrating lever G, which is pivoted to the under side of the hopper. This lever is slotted at its opposite ends to receive studs H H, which are inserted in or fixed to the rods E E', and project through slots in the bottom of the hopper. The studs H H are held in the slots of the lever by the pins $h\ h$, which may be easily drawn out to permit the rods E E' to be taken out of the hopper when desired.

It is manifest that other mechanism may be employed to reciprocate the rods E E', if prefered.

The drill-tubes are not represented; but they are to be connected to the pivoted bar I, so as to be raised and lowered with the latter, by means of the lever J. The bar I is connected by a link, K, to a double bell-crank, L, pivoted to the under side of the hopper. The crank L is slotted at two of its opposite extremities to receive the pins or studs $m\ m$, which project from the slides M M. These slides have apertures corresponding with those in the bottoms of the compartments D D', so that when the slides are moved toward one side of the hopper the apertures are closed, and vice versa. When the bar I is turned to raise the drill-tubes the link K turns the crank L partially around upon its pivot and moves the slides M M, so as to close the discharge-apertures of the hopper. The reverse effect is produced on lowering the drills when the apertures in the slides are placed in communication with those in the hopper.

I am aware that various brush arrangements and other reciprocating devices have been employed to regulate the flow of seed from the hopper; but I know of none at once so simple and effective as the arrangement of rods and pins herein described.

The graduating device shown at N is to regulate the flow of seed and fertilizing material through the apertures at the bottom of the hopper.

Having thus described my invention, the following is what I claim as new herein and desire to secure by Letters Patent:

1. In combination with the hopper having two compartments, $D'$ $D^2$, the reciprocating rods E E', provided with two or more pins, $e$ $e^2$ $e^2$, to each of the holes, the pins being arranged so as to project horizontally over the seed-apertures, and with pins $e'$ projecting upwardly, as and for the purpose set forth.

2. In combination with the above, the cam F, lever G, studs H H, and pins $h$, the whole being arranged and employed substantially as and for the purpose herein set forth.

3. The combination of the lever J, bar 1, link K, pivoted crank L, and slides M M, for the purpose of closing and opening the discharge-apertures of the hopper simultaneously with the raising and lowering of the drill-tubes.

To the above specification of my combined drill and fertilizer I have signed my hand this 16th day of March, A. D. 1866.

GEO. E. COOPER.

Witnesses:
   CHAS. D. SMITH,
   CHAS. A. PETTIT.